(12) United States Patent
Torii

(10) Patent No.: US 10,705,226 B2
(45) Date of Patent: Jul. 7, 2020

(54) POSITIONING DEVICE AND POSITIONING METHOD

(71) Applicant: Furuno Electric Co., Ltd., Nishinomiya (JP)

(72) Inventor: Hayato Torii, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 297 days.

(21) Appl. No.: 15/749,443

(22) PCT Filed: Jul. 5, 2016

(86) PCT No.: PCT/JP2016/069906
§ 371 (c)(1),
(2) Date: Jan. 31, 2018

(87) PCT Pub. No.: WO2017/022390
PCT Pub. Date: Feb. 9, 2017

(65) Prior Publication Data
US 2018/0217268 A1    Aug. 2, 2018

(30) Foreign Application Priority Data
Aug. 6, 2015 (JP) .................................. 2015-156182

(51) Int. Cl.
*G01S 19/43* (2010.01)
*G01S 19/51* (2010.01)
*G01S 19/41* (2010.01)

(52) U.S. Cl.
CPC .............. *G01S 19/43* (2013.01); *G01S 19/51* (2013.01); *G01S 19/41* (2013.01)

(58) Field of Classification Search
CPC .......... G01S 19/44; G01S 19/55; G01S 19/43; G01S 19/51; G01S 19/04; G01S 19/235;
(Continued)

(56) References Cited

U.S. PATENT DOCUMENTS 5,831,575 A *  11/1998  Gu ........................... G01S 19/04
                                                        342/357.31
7,026,982 B2 *  4/2006  Toda ....................... G01S 19/44
                                                        342/357.27
(Continued)

FOREIGN PATENT DOCUMENTS

JP      2000193733 A    7/2000
WO    2012177909 A1   12/2012

OTHER PUBLICATIONS

Japan Association of Surveyors, "Shinteiban Yasashii GPS Sokuryo," Apr. 10, 1997, 11 pages. (See NPL Document 2, International Search Report Issued in PCT Application PCT/JP2016/069906 for Explanation of Relevance).
(Continued)

*Primary Examiner* — Olumide Ajibade Akonai
(74) *Attorney, Agent, or Firm* — Alleman Hall Creasman & Tuttle LLP

(57) ABSTRACT

The purpose is to achieve accurate positioning without calculating an integer bias. A positioning device may include a positioning signal receiver, a triple phase difference calculating module, a triple phase difference adding module, and a positioning module. The positioning signal receiver may detect carrier phases of positioning signals from a plurality of positioning satellites. The triple phase difference calculating module may calculate a triple phase difference based on the carrier phases. The triple phase difference adding module may add the plurality of triple phase differences calculated in different periods. The positioning module may perform relative positioning using an added value of the triple phase differences as an observation value.

10 Claims, 4 Drawing Sheets

(58) Field of Classification Search
CPC ........ G01S 19/07; G01S 5/0284; G01S 19/15; G01S 19/41; G01S 5/06; G01S 5/08
See application file for complete search history.

(56) References Cited

U.S. PATENT DOCUMENTS

| | | | |
|---|---|---|---|
| 2010/0156716 A1* | 6/2010 | Chen | G01S 19/29 342/357.63 |
| 2016/0377726 A1* | 12/2016 | Schipper | G01S 19/29 342/357.59 |

OTHER PUBLICATIONS

ISA Japan Patent Office, International Search Report Issued in PCT Application No. PCT/JP2016/069906, dated Aug. 23, 2016, WIPO, 2 pages.

* cited by examiner

POSITIONING DEVICE AND POSITIONING METHOD

TECHNICAL FIELD

The present disclosure relates to a positioning device, a positioning method, and a positioning program which perform relative positioning.

BACKGROUND ART

Conventionally, various positioning devices have been devised for performing positioning using positioning signals of a GNSS system, such as a GPS.

For example, a positioning device described in Patent Document 1 attempts to achieve highly accurate positioning by performing relative positioning. The positioning device described in Patent Document 1 performs the relative positioning using a double phase difference of a carrier phase and a double phase difference of a code pseudo distance.

REFERENCE DOCUMENT OF CONVENTIONAL ART

Patent Document

Patent Document 1 JP2000-193733A

DESCRIPTION OF THE DISCLOSURE

Problems to be Solved by the Disclosure

However, when the double phase difference of the carrier phase as described in Patent Document 1 is used, an integer bias is required to be calculated. Since the calculation of the integer bias is not easy, if the integer bias cannot be accurately calculated, positioning accuracy degrades.

Therefore, the purpose of the present disclosure is to provide a positioning device, which is capable of achieving highly accurate positioning without requiring to calculate an integer bias.

SUMMARY OF THE DISCLOSURE

According to one aspect of the present disclosure, a positioning device may include a positioning signal receiver, a triple phase difference calculating module, a triple phase difference adding module, and a positioning module. The positioning signal receiver may detect carrier phases of positioning signals from a plurality of positioning satellites. The triple phase difference calculating module may calculate a triple phase difference based on the carrier phases. The triple phase difference adding module may add the plurality of triple phase differences calculated in different periods. The positioning module may perform relative positioning using an added value of the triple phase differences as an observation value.

With this configuration, since the triple phase difference may be used, an integer bias may not be required in operation of the positioning. The triple phase difference may be a differential value of two double phase differences calculated at different times. Further, even if a set time period includes a period within which the carrier phase cannot be calculated, since the carrier phases of the plurality of periods within which the carrier phases are successfully detected may be added, an adding period of the carrier phases to calculate the triple phase difference may be extended.

Further, in the positioning device of the present disclosure, the triple phase difference adding module may add the triple phase differences for each combination of the positioning satellites.

With this configuration, the adding time period of the triple phase difference which is used for the observation value for the relative positioning may not be the same for all combinations of the positioning satellites. Therefore, the observation value for the relative positioning may easily be acquired, and a situation in which the relative positioning cannot be performed may become difficult to occur.

Further, in the positioning device of the present disclosure, the positioning module may set weighting according to an adding period of time of the triple phase difference for each combination of the positioning satellites and perform the relative positioning using the weighting.

With this configuration, by such weighting, the triple phase difference with long acquisition time may have a great influence on a result of the positioning, while the triple phase difference with short acquisition time may have a small influence on the result of the positioning.

Effect of the Disclosure

According to the present disclosure, highly accurate positioning may be achieved without calculating an integer bias.

MODE FOR CARRYING OUT THE DISCLOSURE

Figure 1:
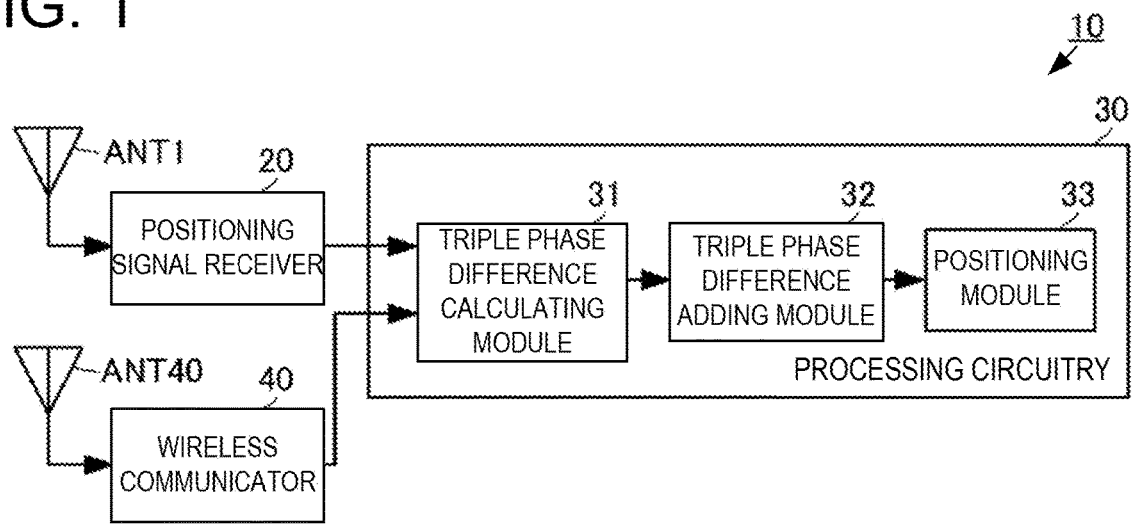
FIG. 1 is a block diagram of a positioning device according to one embodiment of the present disclosure.
Figure 2:
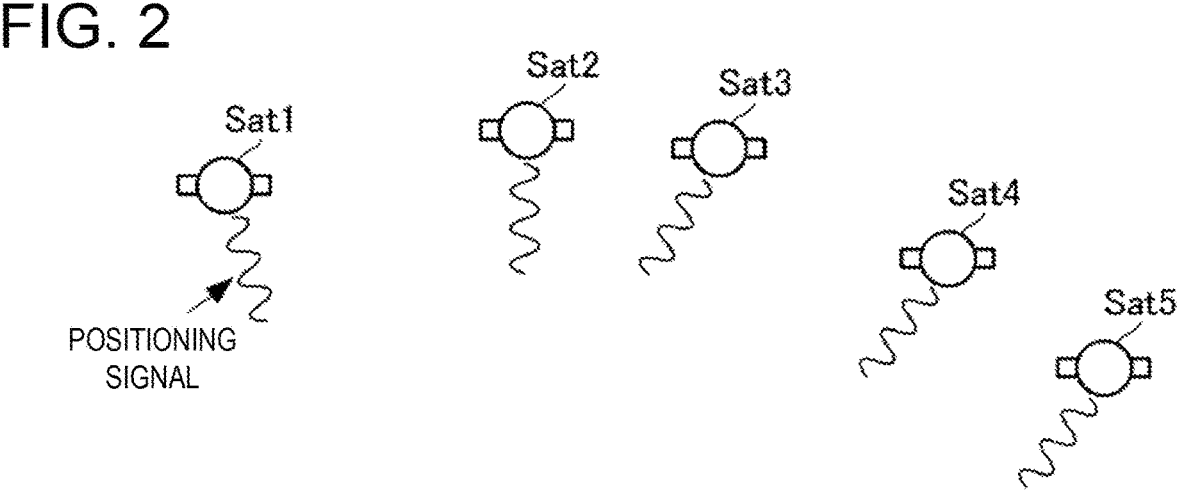
FIG. 2 is a configuration diagram of a positioning system according to the embodiment of the present disclosure.
Figure 2:

A positioning device, a positioning method, and a positioning program according to one embodiment of the present disclosure will be described with reference to the drawings. FIG. 1 is a block diagram of the positioning device according to the embodiment of the present disclosure. FIG. 2 is a configuration diagram of a positioning system according to the embodiment of the present disclosure.

As illustrated in FIG. 1, the positioning device 10 may include a positioning signal receiver 20, processing circuitry 30, a wireless communicator 40, an antenna ANT1, and an antenna ANT40. The processing circuitry 30 may include a triple phase difference calculating module 31, a triple phase difference adding module 32, and a positioning module 33. As illustrated in FIG. 2, the positioning system which includes this positioning device 10 may include the positioning device 10, a positioning device 90 of a base station, and a plurality of positioning satellites Sat1, Sat2, Sat3, Sat4 and Sat5. The positioning device 90 of the base station may be provided with an antenna ANT2 which receives positioning signals. Although not illustrated, the positioning device 90 of the base station may include an antenna and a communication unit configured to perform wireless communication with the positioning device 10.

The antenna ANT1 may be an antenna which receives positioning signals. The antenna ANT1 may be connected to the positioning signal receiver 20. The antenna ANT40 may be an antenna which performs wireless communication with the positioning device 90 of the base station. The antenna ANT40 may be connected to the wireless communicator 40.

The positioning signal receiver 20 may capture and track the positioning signals received by the antenna ANT1. The positioning signals may be signals transmitted from the positioning satellites Sat1, Sat2, Sat3, Sat4 and Sat5 which constitute a GNSS, such as a GPS. The positioning signals may be signals obtained by code-modulating carrier waves of a given frequency with a pseudo spreading code. A navigation message may be superimposed on each positioning signal.

The positioning signal receiver 20 may capture the positioning signal for each of the positioning satellites Sat1, Sat2, Sat3, Sat4 and Sat5 and track them. The positioning signal receiver 20 may detect a carrier phase for each of the positioning satellites Sat1, Sat2, Sat3, Sat4 and Sat5 and output the carrier phases to the triple phase difference calculating module 31 of the processing circuitry 30 at a given time interval.

Using the antenna ANT40, the wireless communicator 40 may receive a carrier phase for each of the positioning satellites Sat1, Sat2, Sat3, Sat4 and Sat5 which are detected by the positioning device 90 of the base station. The wireless communicator 40 may output the received carrier phases to the triple phase difference calculating module 31 of the processing circuitry 30.

The triple phase difference calculating module 31 may calculate a triple phase difference by using the carrier phases from the positioning signal receiver 20 and the carrier phases from the wireless communicator 40. The triple phase difference calculating module 31 may calculate the triple phase difference for each combination of the positioning satellites.

The carrier phases from the positioning signal receiver 20 and the carrier phases from the wireless communicator 40 may be associated with time defined by the GNSS (e.g., GPS time in the case of GPS). The triple phase difference calculating module 31 may calculate the triple phase difference at every given timing by using the carrier phases detected at the same time by the positioning device 10 and the positioning device 90.

The triple phase difference calculating module 31 may calculate the triple phase difference based on the carrier phases in a period in which the carrier phases were successfully acquired continuously in terms of time by both the positioning device 10 and the positioning device 90. That is, the triple phase difference calculating module 31 may calculate the triple phase difference based on a double phase difference in a period in which a double phase difference was successfully calculated continuously in terms of time in both the positioning device 10 and the positioning device 90. The triple phase difference calculating module 31 may calculate the triple phase difference for every such period.

Figure 3:
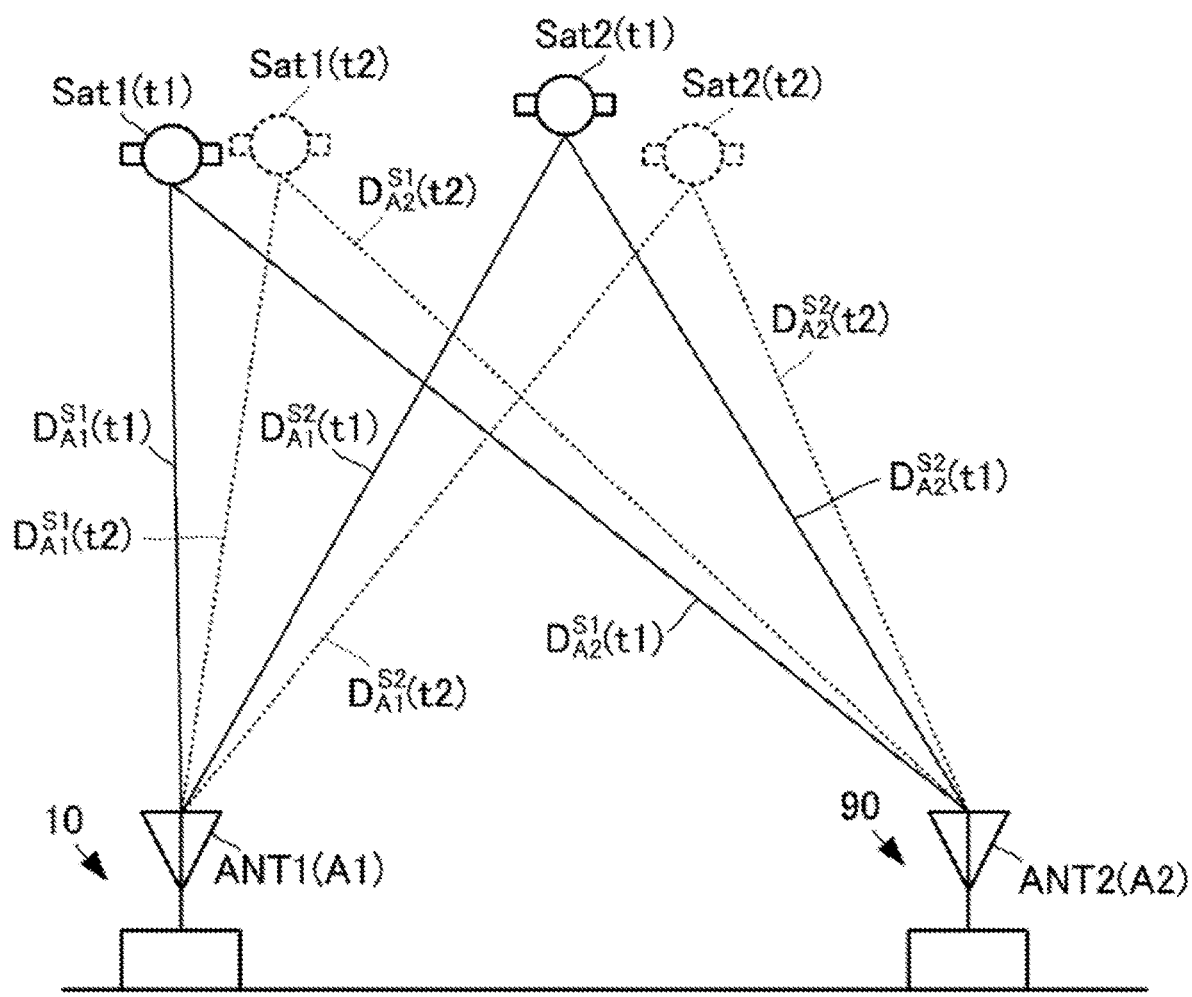
FIG. 3 is a view illustrating a concept of a triple phase difference according to the embodiment of the present disclosure.

FIG. 3 is a view illustrating a concept of the triple phase difference according to the embodiment of the present disclosure. FIG. 3 is a view illustrating the triple phase difference with respect to the positioning satellites Sat1 and Sat2. As illustrated in FIG. 3, the carrier phase when the antenna ANT1 of the positioning device 10 receives the positioning signal transmitted by the positioning satellite Sat1 at time t1 may be $D_{A1}^{S1}(t1)$. The carrier phase when the antenna ANT2 of the positioning device 90 receives the positioning signal transmitted by the positioning satellite Sat1 at time t1 may be $D_{A2}^{S1}(t1)$.

The carrier phase when the antenna ANT1 of the positioning device 10 receives the positioning signal transmitted by the positioning satellite Sat2 at time t1 may be $D_{A1}^{S2}(t1)$. The carrier phase when the antenna ANT2 of the positioning device 90 receives the positioning signal transmitted by the positioning satellite Sat2 at time t1 may be $D_{A2}^{S2}(t1)$.

A single phase difference $D_{A1}^{S1,S2}(t1)$ between the satellites at the positioning device 10 at time t1 may be expressed by the following equation.

$$D_{A1}^{S1,S2}(t1) = D_{A1}^{S1}(t1) - D_{A1}^{S2}(t1) \quad \text{(Equation 1)}$$

A single phase difference $D_{A2}^{S1,S2}(t1)$ between the satellites at the positioning device 90 at time t1 may be expressed by the following equation.

$$D_{A2}^{S1,S2}(t1) D_{A2}^{S1}(t1) - D_{A2}^{S2}(t1) \quad \text{(Equation 2)}$$

A double phase difference $DD_{A1,A2}^{S1,S2}(t1)$ at time t1 may be expressed by the following equation using Equation 1 and Equation 2.

$$DD_{A1,A2}^{S1,S2}(t1) = D_{A1}^{S1,S2}(t1) - D_{A2}^{S1,S2}(t1) \quad \text{(Equation 3)}$$

As illustrated in FIG. 3, the carrier phase when the antenna ANT1 of the positioning device 10 receives the positioning signal transmitted by the positioning satellite Sat1 at time t2 may be $D_{A1}^{S1}(t2)$. The carrier phase when the antenna ANT2 of the positioning device 90 receives the positioning signal transmitted by the positioning satellite Sat1 at time t2 may be $D_{A2}^{S1}(t2)$.

The carrier phase when the antenna ANT1 of the positioning device 10 receives the positioning signal transmitted by the positioning satellite Sat2 at time t2 may be $D_{A1}^{S2}(t2)$. The carrier phase when the antenna ANT2 of the positioning device 90 receives the positioning signal transmitted by the positioning satellite Sat2 at time t2 may be $D_{A2}^{S2}(t2)$.

A single phase difference $D_{A1}^{S1,S2}(t2)$ between the satellites at the positioning device 10 at time t2 may be expressed by the following equation.

$$D_{A1}^{S1,S2}(t2) = D_{A1}^{S1}(t2) - D_{A1}^{S2}(t2) \quad \text{(Equation 4)}$$

A single phase difference $D_{A2}^{S1,S2}(t2)$ between the satellites at the positioning device 90 at time t2 may be expressed by the following equation.

$$D_{A2}^{S1,S2}(t2) = D_{A2}^{S1}(t2) - D_{A2}^{S2}(t2) \quad \text{(Equation 5)}$$

A double phase difference $DD_{A1,A2}^{S1,S2}(t2)$ at time t2 may be expressed by the following equation using Equation 4 and Equation 5.

$$DD_{A1,A2}^{S1,S2}(t2) = D_{A1}^{S1,S2}(t2) - D_{A2}^{S1,S2}(t2) \quad \text{(Equation 6)}$$

The triple phase difference may be defined by a difference between the double phase differences calculated at two different times. Therefore, triple phase differences $DDD_{A1,A2}^{S1,S2}(t1,t2)$ for times t1 and t2 may be a difference between the double phase differences $DD_{A1,A2}^{S1,S2}(t1)$ at time t1 and the double phase difference $DD_{A1,A2}^{S1,S2}(t2)$ at time t2, and expressed by the following equation.

$$DDD_{A1,A2}^{S1,S2}(t1,t2) = DD_{A1,A2}^{S1,S2}(t1) - DD_{A1,A2}^{S1,S2}(t2) \quad \text{(Equation 7)}$$

The triple phase difference calculating module 31 may sequentially output the calculated triple phase difference to the triple phase difference adding module 32.

Figure 4:
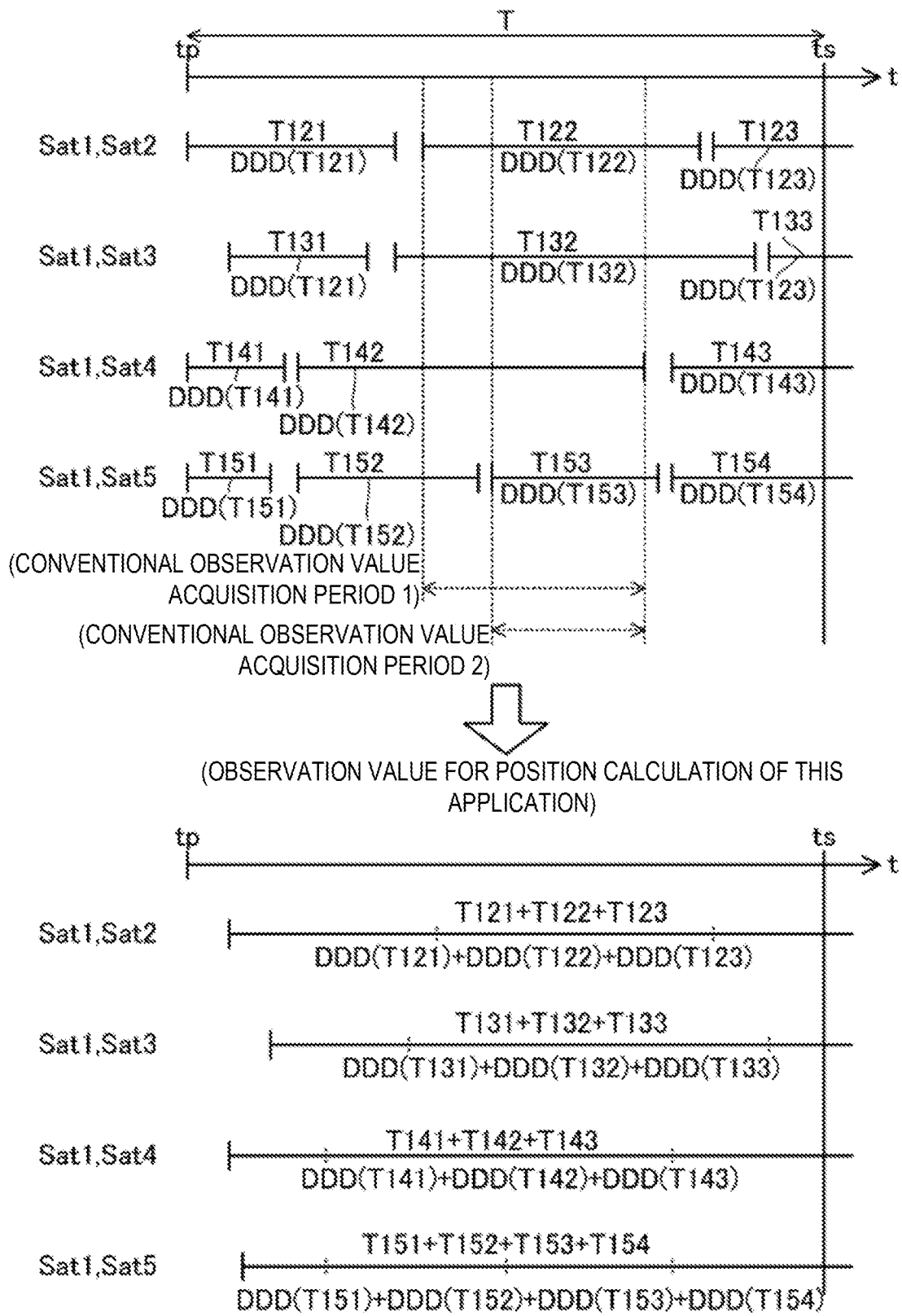
FIG. 4 is a view illustrating a concept of adding the triple phase difference according to the embodiment of the present disclosure.

The triple phase difference adding module 32 may add the triple phase difference for each combination of the positioning satellites. FIG. 4 is a view illustrating a concept of adding the triple phase difference according to the embodiment of the present disclosure.

As illustrated in FIG. 4, the triple phase difference adding module 32 may add the triple phase difference based on a reference time ts. The reference time ts may be repeated at a given time interval and the triple phase difference may be added every time it reaches the reference time ts. The time interval of repetition of the reference time ts may be determined, for example, based on a time interval at which positioning is performed.

The triple phase difference adding module 32 may determine a set period of time T with respect to the reference time ts. The set time period T may be a period during which the triple phase difference is added. For example, in the example of FIG. 4, the triple phase difference adding module 32 may determine a period of time from the reference time ts to time tp in the past to be the set time period T. The triple phase difference adding module 32 may add triple phase differences calculated during a plurality of different periods included within the set time period T.

As one specific mode of addition processing, in the example of FIG. 4, for the combination of the positioning satellites Sat1 and Sat2, the set time period T includes three spans of periods in which the triple phase differences apart from each other on the time axis are calculated. In this case, the triple phase difference adding module 32 may add triple phase differences DDD(T121), DDD(T122) and DDD(T123) calculated in a plurality of periods T121, T122 and T123, respectively.

Similarly, in the example of FIG. 4, for the combination of the positioning satellites Sat1 and Sat3, triple phase differences DDD(T131), DDD(T132) and DDD(T133) in a plurality of periods T131, T132 and T133 apart from each other within the set time period T may be added. For the combination of the positioning satellites Sat1 and Sat4, triple phase differences DDD(T141), DDD(T142) and DDD(T143) in a plurality of periods T141, T142 and T143 apart from each other within the set time period T may be added. For the combination of the positioning satellites Sat1 and Sat5, triple phase differences DDD(T151), DDD(T152), DDD(T153) and DDD(T154) in a plurality of periods T151, T152, T153 and T154 apart from each other in the set time period T may be added.

The triple phase difference adding module 32 may output the added value for each combination of the positioning satellites as a triple phase difference added value for the reference time ts. Note that the combination of the positioning satellites is not limited to this as long as the triple phase differences may be kept independent from each other. Further, the number of combinations of positioning satellites may be three or more combinations comprised of four or more positioning satellites, and more preferably, it may be four or more combinations comprised of five or more positioning satellites.

The triple phase difference adding module 32 may output the triple phase difference added value for each combination of the positioning satellites to the positioning module 33. Here, the triple phase difference adding module 32 may also output the adding time period for each combination of the positioning satellites, along with the triple phase difference added value. The adding time period for each combination of the positioning satellites may be, for example for the combination of the positioning satellites Sat1 and Sat2 in the example of FIG. 4, a value obtained by adding the lengths of the periods T121, T122 and T123.

The positioning module 33 may perform positioning using the triple phase difference added value as an observation value. The positioning module 33 may perform positioning at the reference time ts by using the least squares method.

As is known, regarding the double phase difference, the double phase difference and a geometric distance may be expressed by the following equations. Here, the case for the positioning satellites Sat1 and Sat2 will be shown.

A double phase difference of the positioning devices 10 and 90 with respect to the positioning satellites Sat1 and Sat2 at time ta may be $DD_{A1,A2}^{S1,S2}(ta)$. The geometric distance may be $\rho_{A1,A2}^{S1,S2}(ta)$. An integer bias of the double phase difference in this combination may be $n_{A1,A2}^{S1,S2}$.

$$DD_{A1,A2}^{S1,S2}(ta) = \rho_{A1,A2}^{S1,S2}(ta) + \lambda n_{A1,A2}^{S1,S2} + \varepsilon(ta) \quad \text{(Equation 8)}$$

A double phase difference of the positioning devices 10 and 90 with respect to the positioning satellites Sat1 and Sat2 at time tb may be $DD_{A1,A2}^{S1,S2}(tb)$. The geometric distance may be $\rho_{A1,A2}^{S1,S2}(tb)$. An integer bias of the double phase difference in this combination may be $n_{A1,A2}^{S1,S2}$.

$$DD_{A1,A2}^{S1,S2}(tb) = \rho_{A1,A2}^{S1,S2}(tb) + \lambda n_{A1,A2}^{S1,S2} + \varepsilon(tb) \quad \text{(Equation 9)}$$

Note that, λ may be a wavelength of a carrier wave and c may be an observation error.

Therefore, the triple phase difference caused by the positioning satellites Sat1 and Sat2 and the positioning devices 10 and 90 at times ta and tb may be, similarly to Equation 7, a difference between Equations 8 and Equation 9. Here, the integer bias may be constant. Therefore, the triple phase difference may be expressed by the following equation.

$$DDD_{A1,A2}^{S1,S2}(ta, tb) = \quad \text{(Equation 9)}$$
$$DD_{A1,A2}^{S1,S2}(ta) - DD_{A1,A2}^{S1,S2}(tb) = \rho_{A1,A2}^{S1,S2}(ta) - \rho_{A1,A2}^{S1,S2}(tb) + \Delta\varepsilon$$

Δε may be a difference between the observation error ε(ta) at time ta and the observation error ε(tb) at time tb, which may be extremely small and can be ignored.

$$DDD_{A1,A2}^{S1,S2}(ta,tb) = \rho_{A1,A2}^{S1,S2}(ta) - \rho_{A1,A2}^{S1,S2}(tb) \quad \text{(Equation 10)}$$

As described above, the observation formula using the triple phase difference may not have a term for integer bias. Therefore, even if the set time period T includes a period in which the triple phase difference cannot be calculated and the adding period of the triple phase difference is divided into a plurality of periods, the triple phase differences of the plurality of periods may be added to be used as the observation value as described above. Here, the position of the antenna ANT1 may preferably be stationary.

The geometric distance $\rho_{A1,A2}^{S1,S2}$ may be calculated based on the positions of the positioning satellites Sat1 and Sat2 at time ta, the position of the positioning device 10 (antenna ANT1), and the position of the positioning device 90 (antenna ANT2). As is known, the positions of the positioning satellites Sat1 and Sat2 may be obtainable from satellite orbit information etc. in the navigation message. As is known, the position of the positioning device 90 may be acquirable through wireless communication.

Therefore, based on Equation 10, positioning may be performable by using the least squares method with the position x of the positioning device 10 as an unknown and the triple phase difference $DDD_{A1,A2}^{S1,S2}$ as the observation value. In this case, an observation model h having the position x of the positioning device 10 as the unknown may be set based on the equation expressing the geometric distance $\rho_{A1,A2}^{S1,S2}$. Further, a linearized matrix H may be set by performing a linear approximation on an initial value x0 of the position x. This initial value x0 may be set suitably, for example, it may be set to a position calculated using a code pseudo distance.

Thus, it may become possible to calculate the position of the positioning device 10 (perform positioning) without calculating the integer bias.

Here, with the configuration of this embodiment, the added time period of the triple phase difference may be extended. For example, as illustrated in FIG. 4, a first conventional method adopts a mode in which the longest acquisition time within an added time period in which a required number or more of the triple phase differences are simultaneously acquirable is adopted. However, the time interval between the respective triple phase differences varies, thus preventing to secure a long added time period. Further, a second conventional method adopts a mode in which the triple phase differences are acquired from a combination comprised of as many positioning satellites as possible. However, also in this case, the time interval between the respective triple phase differences varies, thus preventing to secure a long added time period.

On the other hand, with the configuration of this embodiment, it may be possible to add the triple phase differences even though they are acquired with the interval, and the addition is possible for each combination of positioning satellites. Thus, a long added time period may be secured even if the timing of the interval varies among the respective combinations of positioning satellites. It is known that relative positioning with a triple phase difference generally improves positioning accuracy with longer added time period of triple phase difference. Therefore, by using the configuration of this embodiment, highly accurate positioning may be performed.

In this least squares method, the positioning module 33 may perform weighting for each combination of positioning satellites. The weighting may be performed with a weight W applied to the design matrix H in the known least squares method. The weight W may be set to increase as a total added time period of the added value of the triple phase differences extends. More specifically, the weight W may be set so that an error becomes $1/(\sqrt{2})$ when the total added time period is doubled, that is, the square of the error may be inversely proportional to the total added time period.

Such weighting may increase the influence of the triple phase difference with long acquisition time on the positioning accuracy, while reducing the influence of the triple phase difference with short acquisition time on the positioning accuracy. Therefore, it may be possible to improve the accuracy of positioning even more.

Figure 5:
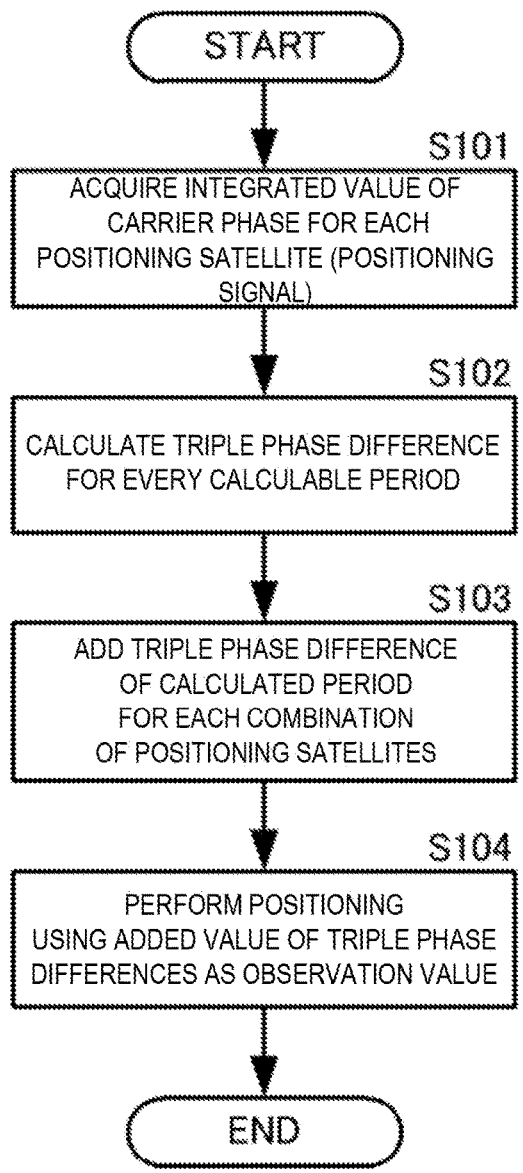
FIG. 5 is a flowchart of a positioning method according to the embodiment of the present disclosure.

Although the above description gave the example in which the respective processings may be executed by the individual functional blocks, the processings described above may be programmed and stored so that an arithmetic processor, such as a computer, executes the program. In this case, the arithmetic processor may execute the following positioning method and positioning program. FIG. 5 is a flowchart of the positioning method according to the embodiment of the present disclosure.

The arithmetic processor may acquire the carrier phase for each positioning satellite (S101). Here, the arithmetic processor may acquire the carrier phase of an antenna as a positioning target (positioning device) and the carrier phase of the base station.

The arithmetic processor may calculate the triple phase difference for each combination of the positioning satellites at every calculable period using the above method (S102). In the set time period T, the arithmetic processor may add the triple phase difference of the period in which the triple phase difference was calculated, for each combination of the positioning satellites (S103). More specifically, if the set time period T includes a timing at which the triple phase difference is not calculated and thus includes, on the time axis, a plurality of different periods in which the triple phase differences are calculated, the arithmetic processor may add the triple phase differences of the plurality of periods. Note that, if the triple phase difference is calculated at all the timings within the set time period T, the arithmetic processor may use one triple phase difference over the set time period T.

Figure 6:
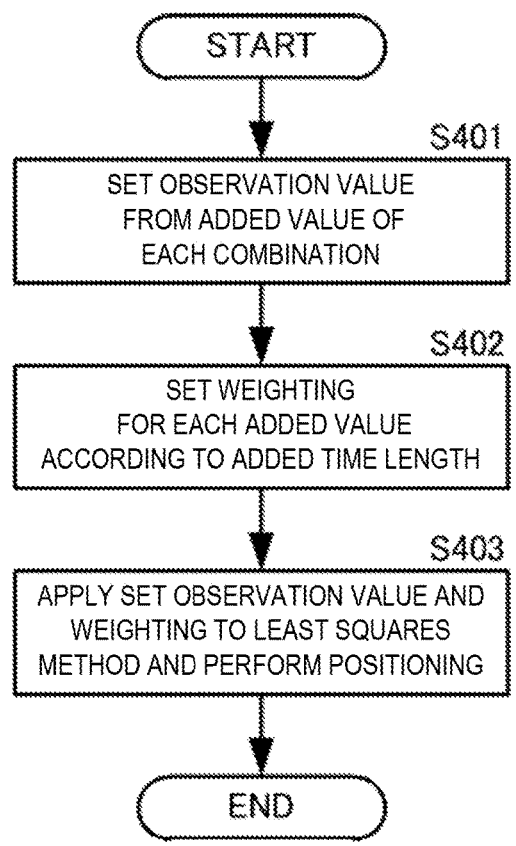
FIG. 6 is a flowchart of a positioning process of the positioning method according to the embodiment of the present disclosure.

The arithmetic processor may perform positioning using the least squares method with the added value of the triple phase differences as the observation value (S104). Here, the arithmetic processor may set weighting as illustrated in FIG. 6. FIG. 6 is a flowchart of a positioning process of the positioning method according to the embodiment of the present disclosure. The arithmetic processor may set the observation value from the added value of the triple phase differences for each combination of the positioning satellites (S401). The arithmetic processor may set the weighting for each added value according to the time length of adding processing in each combination, that is, according to the total added time period of the triple phase difference (S402). The arithmetic processor may apply the set observation value and weighting to the least squares method and perform positioning (S403).

By using such a method, highly accurate positioning may be possible without calculating the integer bias.

Note that, although in the above description the case where the positioning device may be provided at the location where the positioning is performed for is described, it may be such that only an antenna and a communication device are positioned at the location where the positioning is performed for, and a device positioned at a different position from these components performs the calculation and addition of the triple phase differences and performs the positioning.

Further in the above description, the mode in which all the combinations for which the triple phase difference is calculated may include a common positioning satellite is described. However, the positioning satellites in the combination may respectively be different from other combinations. In this case, it may be more preferable if the common positioning satellite is included in every two combinations.

DESCRIPTION OF REFERENCE CHARACTERS

10, 90: Positioning Device
20: Positioning signal receiver
30: Processing circuitry
31: Triple Phase Difference Calculating Module
32: Triple Phase Difference Adding Module
33: Positioning Module
40: Wireless communicator
Sat1, Sat2, Sat3, Sat4, Sat5: Positioning Satellite
ANT1, ANT2, ANT40: Antenna

What is claimed is:

1. A positioning device, comprising:
a positioning signal receiver configured to detect carrier phases of positioning signals from a plurality of positioning satellites; and
processing circuitry configured
to calculate a triple phase difference based on the carrier phases;
to add the plurality of triple phase differences calculated in different periods; and
to perform relative positioning using an added value of the triple phase differences as an observation value, wherein
the processing circuitry adds the triple phase differences for each combination of the positioning satellites, and
the processing circuitry sets weighting according to an adding period of time of the triple phase difference for each combination of the positioning satellites and performs the relative positioning using the weighting.

2. The positioning device of claim 1, wherein the processing circuitry calculates the triple phase difference in a period in which the carrier phases are continuously acquired in terms of time.

3. The positioning device of claim 2, wherein the processing circuitry adds the triple phase differences for each combination of the positioning satellites.

4. The positioning device of claim 3, wherein the processing circuitry sets a set period of time having a given time length from a reference time, and adds the triple phase differences calculated in the set time period.

5. The positioning device of claim 1, wherein the processing circuitry sets a set period of time having a given time length from a reference time, and adds the triple phase differences calculated in the set time period.

6. The positioning device of claim 1, wherein an antenna configured to receive the positioning signals is positioned at a fixed location.

7. A positioning method, comprising:
detecting carrier phases of positioning signals from a plurality of positioning satellites;
calculating a triple phase difference based on the carrier phases;
adding the plurality of triple phase differences calculated in different periods; and
performing relative positioning using an added value of the triple phase differences as an observation value, wherein
the adding the plurality of triple phase differences includes adding the triple phase differences for each combination of the positioning satellites, and
the performing the positioning includes setting weighting according to an adding period of time of the triple phase difference for each combination of the positioning satellites and performing the relative positioning using the weighting.

8. The positioning method of claim 7, wherein the calculating the triple phase difference includes calculating the triple phase difference in a period in which the carrier phases are continuously acquired in terms of time.

9. The positioning method of claim 7, wherein the adding the plurality of triple phase differences includes setting a set period of time having a given time length from a reference time, and adding the triple phase differences calculated in the set time period.

10. The positioning method of claim 7, comprising positioning an antenna configured to receive the positioning signals at a fixed location.

* * * * *